US012614078B2

(12) United States Patent (10) Patent No.: US 12,614,078 B2
Shekkizhar et al. (45) Date of Patent: Apr. 28, 2026

(54) DOMAIN-AWARE LARGE LANGUAGE MODEL GOVERNANCE

(71) Applicant: Salesforce, Inc., San Francisco, CA (US)

(72) Inventors: Sarath Shekkizhar, San Francisco, CA (US); Adam Earle, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/745,562

(22) Filed: Jun. 17, 2024

(65) Prior Publication Data

US 2025/0384281 A1     Dec. 18, 2025

(51) Int. Cl.
        *G06N 3/09*        (2023.01)
        *G06N 3/045*       (2023.01)
        *G06N 3/0895*      (2023.01)
        *G06N 3/098*       (2023.01)

(52) U.S. Cl.
        CPC ................................. *G06N 3/0895* (2023.01)

(58) Field of Classification Search
        CPC .................................................... G06N 3/0895
        See application file for complete search history.

(56) References Cited

U.S. PATENT DOCUMENTS

| 7,191,118 | B2 * | 3/2007 | Bellegarda ............ | G10L 15/197 |
| | | | | 704/E15.024 |
| 11,394,799 | B2 * | 7/2022 | Jackson ................ | H04L 67/306 |
| 11,922,324 | B1 | 3/2024 | Cosentino et al. | |
| 12,019,987 | B1 * | 6/2024 | Yu ........................... | G06N 5/04 |
| 12,277,396 | B2 | 4/2025 | Earle et al. | |
| 12,314,663 | B1 | 5/2025 | Earle et al. | |
| 2022/0277149 | A1 * | 9/2022 | Altschul ............... | G06F 40/284 |
| 2023/0057387 | A1 * | 2/2023 | Kamalakara ............ | G06N 3/08 |
| 2023/0298726 | A1 * | 9/2023 | Kanchan ................ | G16H 10/20 |
| | | | | 706/12 |
| 2023/0376697 | A1 * | 11/2023 | Chow .................... | G06N 3/047 |
| 2024/0265269 | A1 * | 8/2024 | Chen ..................... | G06N 3/044 |

* cited by examiner

*Primary Examiner* — Brandon S Cole

(74) *Attorney, Agent, or Firm* — Nicholson De Vos Webster & Elliott LLP

(57)     ABSTRACT

Techniques are described herein for a method of decreasing the likelihood of out-of-domain LLM responses. The method includes determining, by a block of a LLM, a representation of the text input. The method further includes determining a set of coefficients based at least on a reconstruction of the text input using a dictionary and the representation of the text input. The method further includes performing a sparsity check using the set of coefficients. The method further includes generating a response to the text input based at least on the sparsity check.

26 Claims, 8 Drawing Sheets

DETERMINING, BY A BLOCK OF A LLM, A
REPRESENTATION OF A TEXT INPUT
502

DETERMINING A SET OF COEFFICIENTS BASED AT
LEAST ON A RECONSTRUCTION OF THE TEXT INPUT
USING A DICTIONARY AND THE REPRESENTATION OF
THE TEXT INPUT
504

PERFORMING A SPARSITY CHECK USING THE SET OF
COEFFICIENTS
506

GENERATING A RESPONSE TO THE TEXT INPUT BASED
AT LEAST ON THE SPARSITY CHECK
508

DOMAIN-AWARE LARGE LANGUAGE MODEL GOVERNANCE

BACKGROUND

The field of Artificial Intelligence (AI) focuses on the implementation of artificial neural network systems that aim to mimic the functionality of neurons in the brain. Machine learning is a sub-area of AI in which a machine learning model is trained to perform one or more specific tasks. For instance, a machine learning model can be trained to perform a target task by relying on patterns and inferences learned from training data, without requiring explicit instructions pertaining to how the task is to be performed.

Large language models (LLMs) are neural networks trained to mimic human language. Specifically, LLMs are trained to predict a next token of a block of text. In operation, LLMs track relationships in sequential data by receiving tokens (e.g., words in a sentence) and predicting a next token (or sequence of tokens). Accordingly, LLMs are well suited to form conversations (e.g., taking turns asking questions and providing responses) by predicting tokens (or sequences of tokens) that are tailored to the style and context of the conversation.

SUMMARY

Techniques are described herein for a method of decreasing the likelihood that the predicted next token determined by the LLM is out-of-domain. In operation, a LLM is augmented with a domain manager system that determines whether a representation of an input token, determined during an intermediate step of the LLM operations, is in-domain or out-of-domain. The LLM can be any pre-trained or fine-tuned LLM that can receive any input prompt (e.g., an input prompt supplemented with retrieval augmented generation, an input prompt generated using any one or more prompt engineering techniques, etc.).

The domain manager system can monitor a number of out-of-domain representations determined during intermediate steps of the LLM operations, substitute an out-of-domain representation with an in-domain representation, and/or cease the operations of the LLM and provide a predetermined in-domain response. Changing the LLM response, from being a response with one or more predicted next tokens with increased likelihoods of being out-of-domain, to a predetermined in-domain LLM response, decreases the likelihood of out-of-domain responses determined by the LLM augmented with the domain manager system. Additionally or alternatively, substituting a representation with an increased likelihood of being out-of-domain, determined by an intermediate step of the LLM, with a closest in-domain representation, increases the likelihood that the predicted next token is in-domain. That is, instead of a representation with an increased likelihood of being out-of-domain being propagated through the processing of the LLM, a closest in-domain representation is substituted for the likely out-of-domain representation. Accordingly, the domain manager system decreases the likelihood that the predicted next token is out-of-domain.

BRIEF DESCRIPTION OF THE DRAWINGS

The detailed description is described with reference to the accompanying drawings in which.

DETAILED DESCRIPTION

Figure 1:
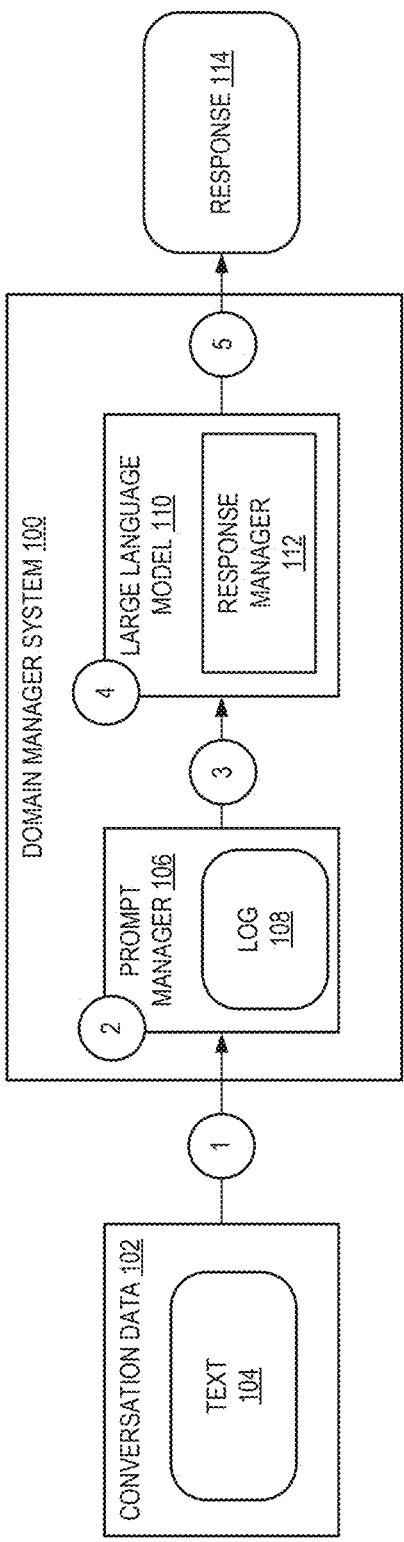
FIG. 1 illustrates an example domain manager system, in accordance with one or more embodiments.

LLMs can be trained using any text on the Internet as training data to tune billions of hyperparameters of the LLM. The LLM learns how to extract meaningful features (e.g., underlying patterns, characteristics, processes, etc.) of human language and predict coherent and contextualized responses to an input. The input to an LLM is referred to as a prompt and includes a task description and natural language text such as a question or a statement. The prompt can include instructions and/or examples of content used to explain the task that the LLM is to perform. Modifying the instructions, examples, content, and/or structure of the prompt causes modifications to the output of the LLM. For example, changing the instructions included in the prompt causes changes to the generated content determined by the LLM.

Fine-tuning the LLM may refer to a mechanism of adjusting parameters of a previously trained LLM by training the pretrained LLM to perform new task and/or training the pretrained LLM using new data such as domain-specific data. A domain can include a particular technology field, service field, product, and the like. Domain-specific data may include domain-specific vocabulary, domain-specific style (e.g., the use of acronyms, casual style, conservative style, professional style), and/or domain-specific formatting associated with a particular domain. For example, a reward number associated with a first domain can be four digits such that the reward number "1234" is a valid reward number. In a second domain, a reward number is six digits such that the reward number "1234" is an invalid reward number.

The characteristics of domain-specific data distinguish such data from other domains that may not have the same vocabulary, style preferences, and/or formatting preferences. For example, the questions asked, the answers provided, the vocabulary, and the tone of a first domain (e.g., a medical domain) can be different from the questions asked, the answers provided, the vocabulary, and the tone of the second domain (e.g., a hospitality domain).

A domain can be defined broadly or narrowly. For example, a LLM trained to perform a domain-specific task can be trained for a domain of any "service provider" industry that involves making reservations. Additionally or alternatively, a LLM trained to perform a domain-specific task can be trained for a domain of a subset of the "service provider" industry such as "medical" service providers (e.g., doctor's offices). Additionally or alternatively, a LLM trained to perform a domain-specific task can be trained for a domain that is a narrower subset of the "medical service provider" industry such as a specific doctor's office associated with a medical specialization (e.g., general practitioners, orthopedic surgeons, pediatricians, etc.) or a geographic area. For example, making reservations with a doctor's office in a Southern state of the United State of America may involve different vocabulary and/or tone than making reservations with a doctor's office in a Western state of the United States of America.

Additionally or alternatively, a LLM trained to perform domain-specific tasks can be trained to perform any tasks associated with a domain. For example, a LLM trained for a particular orthopedic surgeon's office can perform tasks such as scheduling, sending invoices, billing, communicating reminders to patients, and other tasks associated with the particular orthopedic surgeon's office. Accordingly, the training of the LLM used to teach the LLM to perform a task in one domain may be insufficient if the LLM is to be deployed in another domain. That is, the LLM trained to perform a task in a first domain may perform the task in a second domain at a degree of confidence that fails a threshold degree of confidence.

One technical problem associated with the deployment of LLMs is constraining the responses. For example, training a LLM to perform a task in a domain does not limit the LLM to only performing the task in that domain. One example of this is "hallucination", where the LLM generates a response that is factually incorrect and/or irrelevant given the input prompt. Additionally or alternatively, LLMs can generate responses that are biased, inappropriate, political, or the like. Such responses are generated, in part, because of the wealth of information on the Internet that was processed by the LLM during training. For example, the LLM is exposed to popular or unpopular opinions that it can include in a response and misrepresent as fact.

Some conventional approaches constrain the responses generated by LLMs by defining a set of policies, rules, and/or guidelines in the input prompt received by the LLM. For example, the input prompt can include text-based rules that restrict the domain scope. Including such rules in the input prompt increases the length of the prompt, which increases the time and computing resources necessary for the LLM to process the prompt. Additionally or alternatively, increasing the length of the prompt with rules can reduce the space in the prompt for other information. For example, some LLMs have context limits that limit the amount of information that can be inserted into the input prompt. Including such rules in the prompt prevents the LLM from receiving other information. Additionally or alternatively, the LLM can become confused with the content in the prompt. For example, in cases in which an LLM receives a long prompt with lots of sets of instructions (e.g., formatting instructions, domain restriction rules, etc.), the LLM may forget to adhere to each of the instructions in the prompt. That is, the complexity and length of the prompt blurs the instructions in the prompt such that the LLM follows some instructions and/or rules and inadvertently does not follow other instructions and/or rules.

Other conventional approaches constrain the responses generated by LLMs using one or more systems to review the generated responses. For example, classifiers, decision trees, and/or clustering systems are deployed to review the responses generated by LLMs. However, such approaches require training data such that the systems learn what responses are in-domain (e.g., factually correct, follow domain-specific guidelines) and what responses are out-of-domain. Such training data can be difficult to obtain, in terms of the memory and/or bandwidth associated with storing labels for in-domain and out-of-domain responses and the computing resources associated with generating in-domain and out-of-domain response labels. Further, computing resources are required to train such conventional systems. Additionally or alternatively, the trained systems may be overfit. That is, the trained systems are specialized with respect to the domain-specific data and can fail to generalize new, unseen data. Further, conventional approaches that use trained systems may be unable to capture the vast range of the generation vocabulary available to the LLM.

To address these and other deficiencies of conventional approaches, the domain manager system of the present disclosure detects a sub-space of an intermediate step or process performed by a LLM using dictionary learning. Detecting the sub-space of the intermediate step or process performed by the LLM represents capturing the specific domain or policy learned by the LLM. The domain manager system of the present disclosure evaluates whether a representation determined by the intermediate step or process performed by the LLM is contained within the detected sub-space. In operation, the domain manager system can constrain the representation determined by the intermediate step or process using a dictionary reconstruction of the representation, where the dictionary reconstruction is bounded by the detected sub-space. Accordingly, the technical problem of constraining LLM responses is achieved using a detected sub-space and constraining the intermediate step or processed performed by the LLM with respect to the detected sub-space. The domain manager system leverages the sparsity of a set of coefficients associated with the dictionary reconstruction to determine whether the representation determined by the intermediate step or process of the LLM is in-domain or out-of-domain.

FIG. 1 illustrates an example domain manager system, in accordance with one or more embodiments. In some embodiments, the domain manager system 100 may be incorporated into an application, a suite of applications, etc. or may be implemented as a standalone system which interfaces with an application, a suite of applications, etc.

At numeral 1, the conversation data 102 is passed to the domain manager system 100. Conversation data 102 can include any communication data between a user and a machine learning model such as large language model (LLM) 110. The LLM 110 is a machine learning model associated with a service provider that is augmented with response manager 112. The service provider is any provider that provides or enables at least one form of service for the user. In some embodiments, the service provider automates an interface with the user (e.g., a customer service agent, a receptionist, and the like) such that the user communicates with the LLM 110 associated with the service provider. Accordingly, conversation data 102 includes any communication data associated with the communication between the user and the LLM 110 associated with the service provider. Conversation data 102 can include audio data (e.g., a user speaking to customer service agent over a telephone), text data (e.g., a user chatting using natural language text with a customer service agent), and/or video data (e.g., a user visually communicating with a customer service agent using a camera or other sensor).

While text 104 is described, it should be appreciated that other types of conversation data 102 can be passed to the domain manager system 100 at numeral 1. Text 104 includes any one or more words and/or characters associated with a user. For example, any one or more natural language algorithms can derive text 104 from audio conversation data (e.g., conversation data 102). In some embodiments, text 104 can be a word-by-word stream of words transcribed in real time spoken by the user (e.g., conversation data 102). For example, the text 104 of the conversation data 102 can be generated at a time when a user is actively engaged in a communication with the service provider (e.g., LLM 110).

At numeral 2, the prompt manager 106 receives the text 104. The prompt manager 106 generates the prompt for the LLM 110 using text 104. As described herein, a prompt is a natural language instruction used to instruct an LLM to perform a task. For example, the prompt can instruct the LLM 110 to respond to text 104 and/or log 108. In some embodiments, the prompt can instruct the LLM 110 to predict a next token of the user's turn given a sequence of tokens (e.g., the tokenized conversation or log 108).

Log 108 is an accumulation of the text 104. For example, over time, (e.g., over a duration of the conversation), the prompt manager 106 buffers text 104 and generates log 108. Accordingly, as the conversation progresses, the log 108 maintains a history of the conversation and/or a portion of the conversation. Portions of the conversation stored in log 108 can include a number of past turns of the conversation, a number of the most recent text 104 (e.g., words, sentences, phrases, characters, etc.) received by the domain manager system 100, a number of the most recent seconds of the conversation, a number of bytes of buffered text 104, and the like. A turn is an interaction of the conversation, such as block of speech (audio or text) communicated by one of the participants in the conversation (e.g., a user and the LLM 110). For instance, one turn of the conversation can include a user speaking to an automated chat bot (e.g., LLM 110). A subsequent turn of the conversation includes the chat bot's response to the user. Accordingly, the log 108 can store tokens of the k most recent turns of the conversation. Additionally or alternatively, the log 108 includes all of the turns of the conversation (e.g., all of the tokens). For example, the log 108 can include text 104 associated with every turn from the initialization of the conversation to the current position in the conversation.

The log 108 can be updated in real time as the communication between a user and a customer service agent (such as a chat bot) progresses. For example, each time the customer service agent and/or user speak, the log 108 is updated with a token corresponding to the spoken audio.

In some embodiments, the log 108 stores one or more tokenized representations of text 104. For example, one or more words, portions of words (e.g., characters), and/or one or more phrases of the conversation data 102 are stored as tokens in the log 108.

The prompt manager 106 can generate the prompt including log 108 and/or text 104 using any prompt engineering technique. Prompt engineering optimizes the structure and/or content of a prompt. For example, some prompts can include examples of outputs to be generated by the LLM 110 (e.g., few-shot prompts). Specifically, examples of portions of domain-specific conversations can be included in the prompt. In some embodiments, prompts do not include examples of outputs to be generated by the LLM 110 (e.g., zero-shot prompts).

In some embodiments, the prompt manager 106 generates the prompt using retrieval augmented generation (RAG). RAG is used to query knowledge databases (such as RAG database) to provide context to language models (such as LLM 110) using the prompt. For example, a first RAG database is associated with the medical field and the second RAG database is associated with a hospitality field. Accordingly, the prompt manager 106 can query the first RAG database given conversation data 102 associated with a doctor's office, and the prompt manager 106 can query the second RAG database given conversation data 102 associated with a hotel company. In embodiments, where there are multiple RAG databases, the prompt manager 106 receives an indication of which RAG database to query. For example, the text 104 (or log 108) can include a tag indicating a particular domain. Responsive to the indication of the particular domain, the prompt manager 106 determines which RAG database to query. For example, conversation data 102 tagged with "1" indicates a conversation associated with the first domain, and conversation data 102 tagged with "2" indicates a conversation associated with the second domain.

At numeral 3, the large language model (LLM) 110 receives the log 108 (e.g., the one or more tokens representing the conversation) via a prompt determined by the prompt manager 106. In some embodiments, the LLM 110 receives text 104 via a prompt determined by the prompt manager 106. The input (e.g., log 108 and/or text 104) can be natural language text or a token representation of natural language text. The LLM 110 can be any LLM trained to perform natural language understanding tasks. In some embodiments, the LLM 110 is a pretrained LLM, and in some embodiments the LLM 110 is a domain-specific LLM (e.g., an LLM that has been fine-tuned to perform a natural language understanding task in a particular domain).

At numeral 4, the LLM 110 predicts a next token of the log 108 and/or text 104, representing the likely next word, character, and/or phrase of the conversation. The predicted next token has a decreased likelihood of being out-of-domain because of the response manager 112. One or more predicted next tokens of the log 108 and/or text 104 determined by the LLM become response 114. As described herein, a response determined by the LLM 110 is out-of-domain if the response is factually incorrect, irrelevant to the text 104 and/or log 108, and/or conflicts with a set of policies or LLM governance rules.

The response manager 112 is LLM agnostic and can perform different operations to decrease the likelihood that the predicted next token of the log 108 and/or text 104 determined by any LLM (e.g., pretrained LLMs or domain specific LLMs) receiving any prompt (e.g., prompts supplemented with RAG or prompts generated using any prompt engineering technique) is out-of-domain. Monitoring operations performed by the response manager 112 include monitoring blocks of the LLM. A block of the LLM can include one or more portions of any LLM such as an encoder, a decoder, a transformer, a feed forward layer, self-attention layers, cross-attention layers, and the like. The blocks of the LLM represent the intermediate steps and/or processes performed by the LLM to determine the predicted next token. Each block determines a representation of the input token (e.g., log 108 and/or text 104) that is used to determine the predicted next token. In some embodiments, if the response manager 112 determines that a threshold number of blocks determine representations of the log 108 and/or text 104 that are out-of-domain, then the response manager 112 can trigger a predetermined response 114. That is, the response manager 112 can cease or otherwise pause the operations of the LLM 110 such that the response 114, instead of being a response generated by the LLM 110, is a predetermined response. Predetermined LLM responses can include "Let me connect you with a supervisor," or "Can you please ask that question again in a different way?" Substitution operations performed by the response manager 112 include substituting an out-of-domain representation of the log 108 and/or text 104 with a closest in-domain representation of text 104 and/or log 108.

As a result, instead of the response 114 (or the predicted next one or more tokens of response 114) being out-of-domain, response 114 is either an in-domain predetermined response or an in-domain LLM generated response by virtue of the representations used to determine response 114 being in-domain. Accordingly, the likelihood of response 114 being an out-of-domain response decreases.

At numeral 5, the response 114 is output by the domain manager system 100, wherein the probability of the response being out of domain is low. In some embodiments, the response 114 is provided to the user associated with the conversation data 102 (e.g., the response 114 is spoken to the user via synthetic voice generation, the response 114 is displayed to the user via a chat display). In some embodiments, the response 114 is passed to one or more downstream processes.

Figure 2A:
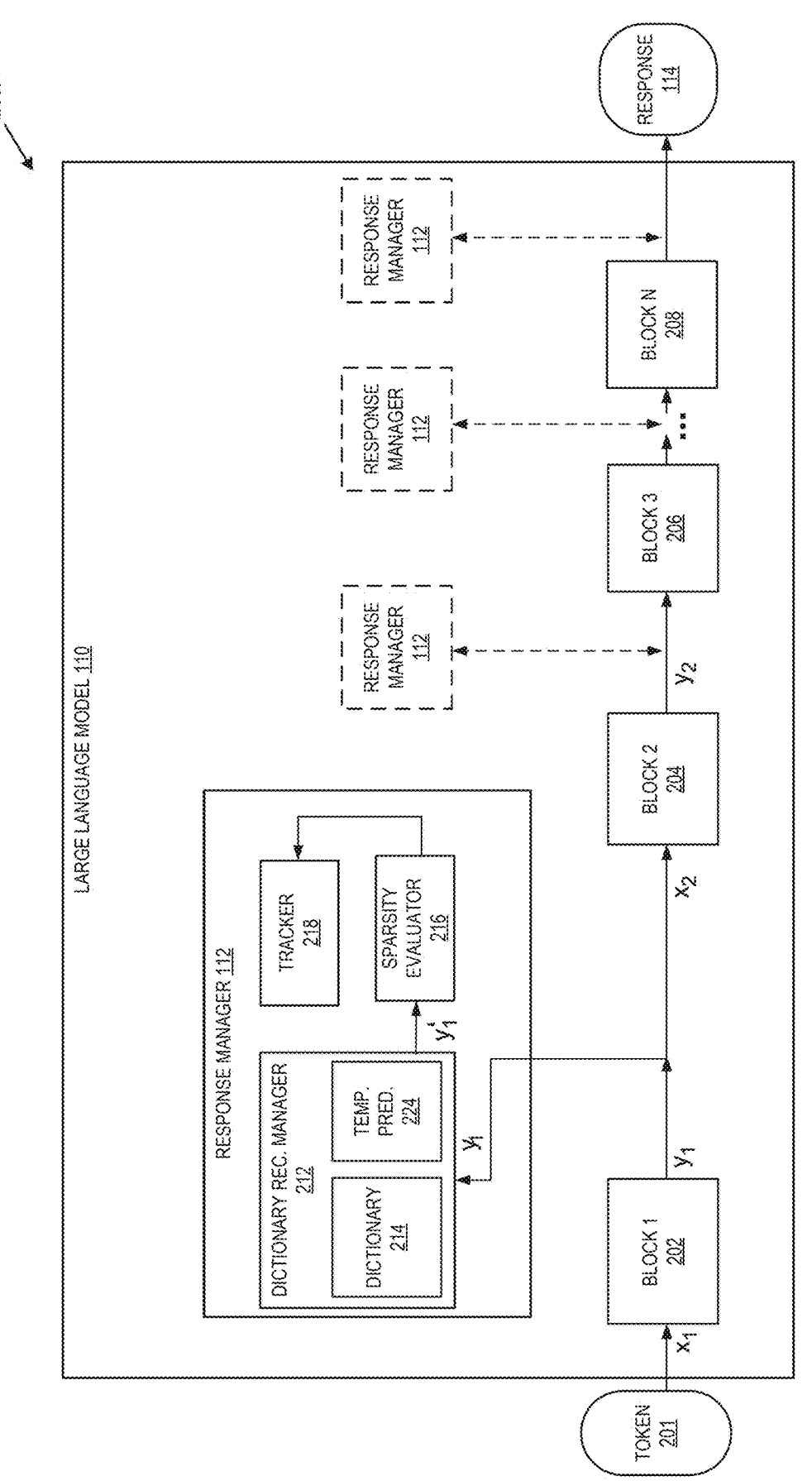
FIGS. 2A-2B illustrate examples of the response manager and the large language model, in accordance with one or more embodiment.
Figure 2B:
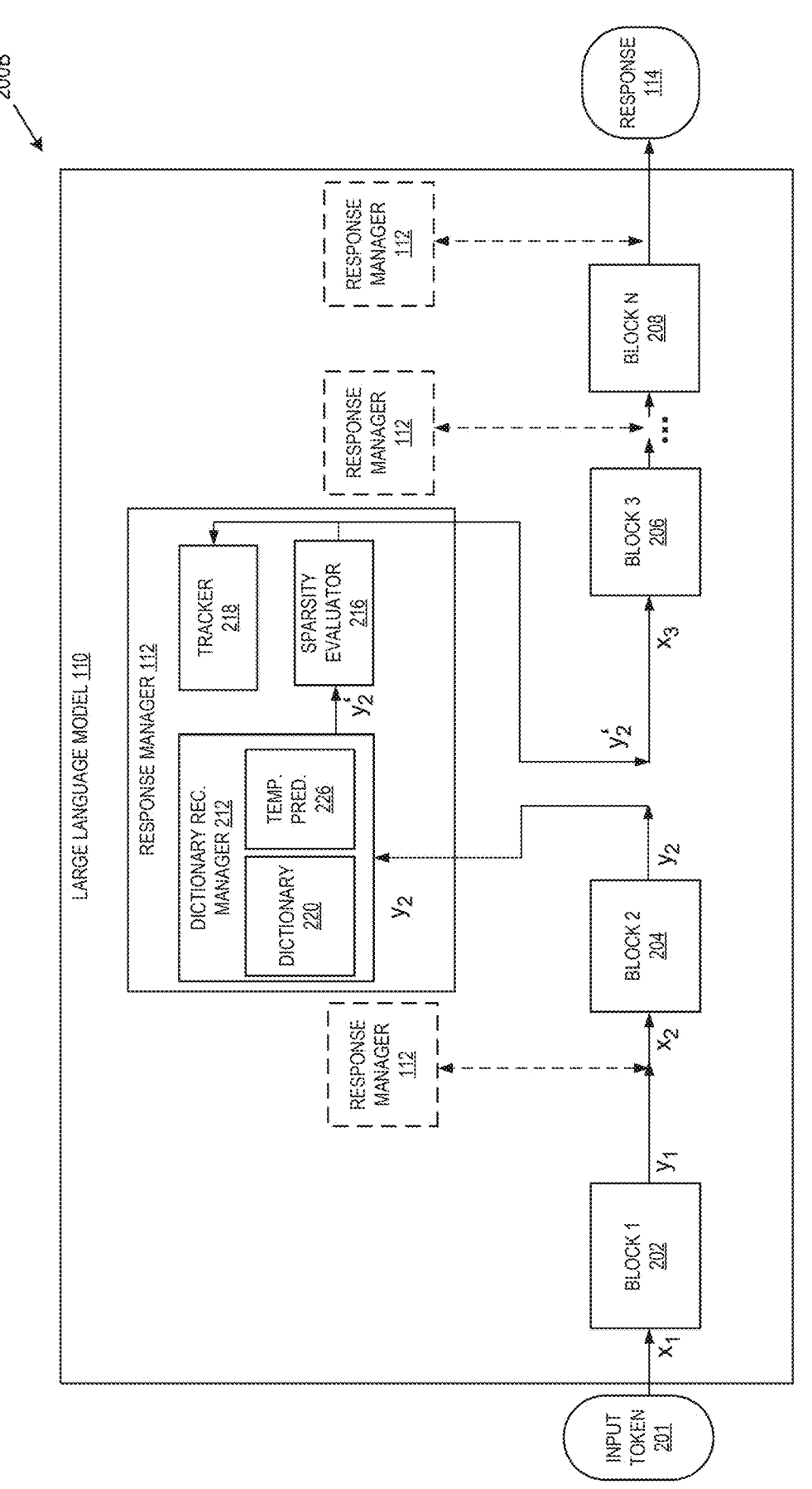

FIGS. 2A-2B illustrate examples of the response manager and the large language model, in accordance with one or more embodiments. Example 200A illustrates a first example placement and operation of response manager 112, and example 200B illustrates a second example placement and operation of response manager 112. It should be appreciated that one or more response managers 112 may supplement one or more blocks of the LLM, thereby augmenting the LLM. If the LLM 110 is configured with multiple response managers 112, each response manager 112 can be configured to operate the same way (e.g., performing monitoring operations), operate in different ways (e.g., a first response manager 112 performs monitoring operations and a second response manager 112 performs substitution operations), or some combination (e.g., the first and second response manager 112 perform monitoring operations, and a third response manager 112 performs substitution operations).

As shown, LLM 110 includes block 1 202 to block N 208. In general, a first block of the LLM 110 receives token 201 (e.g., text 104 and/or log 108 described in FIG. 1). Each sequential block of the LLM transforms the token into a representation (e.g., a high dimensional representation, a low dimensional representation, an encoded token, extracted features or properties associated with the token, a masked representation of the token, and/or some combination). The LLM 110 can generate a predicted next token using the sequential processing of representations corresponding to the input token 201. A set of one or more predicted next tokens is accumulated to become a response (e.g., response 114 described in FIG. 1).

As described herein, each block represents a set of layers configured to perform a task of the LLM (e.g., an encoder block, a decoder block, a self-attention block, a cross-attention block, a feedforward block, etc.). Accordingly, each block performs one or more intermediate steps in determining the predicted next token in the response. As a result, each block is associated with a unique sub-space. While blocks 1 202 to block N 208 are illustrated, it should be appreciated that the LLM 110 can include more or less blocks.

The input to a block is represented as $x_b$, $b \in 1 \ldots N$ and the output of the block is represented as $y_b$, $b \in 1 \ldots N$. The sequential transformations of an input token 201 using each of the LLM blocks (e.g., block 1 202 to block N 208) result in the LLM 110 output, which is a predicted next token included in the response 114. In some embodiments, the response 114 is an accumulation of one or more predicted next tokens. For example, each predicted next token determined by the LLM 110 can be a character or word and the response 114 is a sentence.

In operation, the LLM 110 processes the input token 201 to predict a next token. The output of the last block (e.g., $y_n$ associated with the Nth block, block N 208) can be an k-dimensional vector of logits (e.g., a number k of unnormalized scores corresponding to k candidate predicted next tokens for the predicted next token). Each dimension of the k-dimensional vector represents a token of k candidate predicted next tokens for the next token. The output of the last block can also include a probability distribution. In some embodiments, block N 208 can include a softmax function, which is a normalized exponential function that transforms an input of real number logits into a normalized probability distribution over candidate predicted next tokens. The probability distribution represents the probability of each of the k candidate predicted next tokens being the next token.

In some embodiments, the LLM 110 can use beam searching to identify multiple vectors of logits and process the multiple vectors of logits as a batch. For example, instead of predicting a single k-dimensional vector of candidate predicted next tokens for the next token, the LLM 110 can predict a first k-dimensional vector of candidate predicted next tokens for the next token (e.g., a j+1 token), a second k-dimensional vector of candidate predicted next tokens for the subsequent token (e.g., the j+2 token), and so on, using beam searching or other multi-step generational searching. Whereas the prediction of the j+1 token is independent of the j+2 token, the prediction of the j+2 token is dependent of the j+1 token. Accordingly, the LLM 110 can use beam searching to predict subsequent tokens of the sequence (e.g., the j+1 token, the j+2 token, etc.) using the conditional probability of previous tokens in the sequence.

The response manager 112 is configured to obtain an output from any block of the LLM 110. As shown in example 200A, the response manager 112 receives input $y_1$ from the output of block 1 202. The response manager 112 includes a dictionary reconstruction manager 212, which is responsible for determining a dictionary reconstruction of the output of the LLM block. In other words, in example 200A, the dictionary reconstruction manager 212 determines a dictionary reconstruction of $y_1$ from the output of block 1 202.

The dictionary reconstruction manager 212 determines the dictionary reconstruction $$y_b'$$

of the output of the block (e.g., $y_b$). Ideally, the dictionary reconstruction $$y_b'$$

is equivalent to the output of the block $y_b$. The dictionary reconstruction manager 212 uses a dictionary 214 and a template predictor 224 unique to the LLM block supplemented by the response manager 112 to determine the dictionary reconstruction $$y_b'$$

of the output of the block (e.g., $y_b$). In operation, the dictionary $D_b$ captures the unique domain-specific or policy-aligned sub-space associated with a block of the LLM. The template predictor $U_b$ predicts the templates of the dictionary to map to the particular output determined by the block of the LLM. In other words, the template predictor $U_b$ predicts the templates that represent $y_b$.

In some embodiments, there is a unique dictionary (e.g., $D_b$, $b \in 1 \ldots N$) and template predictor (e.g., $U_b$, $b \in 1 \ldots N$) associated with each block 1 202 to block N 208 of the LLM 110. In other embodiments, a single dictionary and template predictor can be used with any block of the LLM 110 (e.g., the dictionary and template predictor are not unique to a particular block of the LLM 110). For example, a single dictionary D can be applied to any block of the LLM 110. In other embodiments, a single block of the LLM 110 can be associated with multiple dictionaries and template predictors. For example, a first dictionary $$D_b^1$$

represents a first dictionary of block b, where the first dictionary corresponds to a first sub-space, and a secondary dictionary $$D_b^2$$

represents a second dictionary of block b (e.g., a sub-space of a specific domain), where the second dictionary corresponds to a second sub-space (e.g., a behavioral constraint, a policy guideline, etc.). Each dictionary and template predictor pair can be associated with a response manager. For example, a first dictionary and template predictor pair is associated with a first response manager configured to perform monitoring operations to decrease the likelihood of an out-of-domain response for a particular domain (e.g., a hospitality domain). In the above example, a second dictionary and template predictor pair is associated with a second response manager configured to perform substitution operations to decrease the likelihood of an out-of-domain response for a particular policy (e.g., generate content that is safe for work, for example, including content that is not racist or misogynistic). Accordingly, different responses managers, including different dictionary and template pairs, can perform different or similar operations (e.g., monitoring operations or substitution operations). In example 200A, dictionary 214 and template predictor 224 represent the dictionary and template predictor respectively associated with block 1 202.

The dictionary $D_b$ is a matrix or function that is characterized by defining a domain-specific or policy-aligned sub-space associated with a block of the LLM. For ease of description, the dictionary $D_b$ is described as a matrix. The dictionary is a collection of in-domain templates (e.g., vectors, matrices, functions, etc.) that can be used to represent the output of the block (e.g., $y_b$). In other words, templates represent portions or characteristics of an in-domain output of the block (e.g., $y_b$). For ease of description, the template is described as a vector. Accordingly, each row of the dictionary $D_b$ corresponds to a template.

The dictionary reconstruction manager 212 determines a dictionary reconstruction $$y_b'$$

as a linear combination of the templates of dictionary $D_b$. Mathematically, this can be represented according to Equation (1) below:

$$y_b' = D_b C_b \tag{1}$$

In Equation (1) above, $y_b'$ is the dictionary reconstruction of the output of the LLM block $y_b$. The weighting coefficient vector Cp represents the set of coefficients to be combined with the templates in $D_b$. The linear combination of the dictionary $D_b$ and the weighting coefficient vector $C_b$ is used to weigh each of the templates of the dictionary $D_b$ to obtain a closest in-domain representation of $y_b$, where the closest in-domain representation of $$y_b'.$$

In operation, the weighting coefficient vector $C_b$ weighs each of the templates in $D_b$. Non-zero values of the elements of the weighting coefficient vector $C_b$ represent weights applied to the templates in $D_b$. Accordingly, fewer non-zero values of $C_b$ (e.g., a sparse vector $C_b$) represent a closer relationship of the input signal to the response manager 112 $y_b$ to the dictionary reconstruction $$y_b'.$$

In contrast, higher numbers of non-zero values of the weighting coefficient vector $C_b$ represent a more distant relationship of the input signal to the response manager 112 $y_b$ to the dictionary reconstruction $$y_b',$$

indicating an input signal $y_b$ that is likely not constrained within the bounds of the dictionary $D_b$.

The set of coefficients of the weighting coefficient vector $C_b$ are determined by performing an operation on the input signal to the response manager 112 $y_b$. The operation on the input signal can be represented mathematically according to Equation (2) below:

$$C_b = \sigma(U_b y_b) \tag{2}$$

As shown in Equation (2) above, $U_b$ is a matrix or function that represents a prediction of the templates of dictionary $D_b$ that map to the input signal $y_b$. Accordingly, the set of coefficients are based on the dictionary. Sigma represents a non-linear activation function such as the rectified linear unit (ReLU) or sigmoid linear unit (SiLU). The non-linear activation function $\sigma$ allows the weighting coefficient vector C to capture non-linear patterns of the combination of the template predictor Up and the input to the response manager 112 (e.g., $y_b$).

Accordingly, the template predictor $U_b$ and the dictionary $D_b$ are used to determine the in-domain closest representation $$y_b'$$

(e.g., the dictionary reconstruction) of the input signal $y_b$. As shown in example 200A, the closest in-domain representation of the input signal to the response manager 112 (e.g., $y_1$) is $$y_1'.$$

To determine whether the output of the LLM block is in-domain (e.g., whether $y_1$ of example 200A is in-domain), a sparsity evaluator 216 evaluates the sparsity of the weighting coefficient vector C used to determine the closest in-domain representation $$y_1'.$$

In some embodiments, the sparsity evaluator 216 compares the sparsity of the weighting coefficient vector C to a sparsity pattern. In some embodiments, the sparsity evaluator 216 compares patterns of zero elements and/or patterns of non-zero elements of the weighting coefficient vector C to stored patterns of zero elements and/or patterns of non-zero elements, where the stored patterns of zero elements and/or patterns of non-zero elements correspond to in-domain representations. If the patterns of zero elements and/or patterns of non-zero elements satisfy a threshold similarity to the stored patterns of zero elements and/or patterns of non-zero elements, then the sparsity evaluator 216 determines that the weighting coefficient vector C is in-domain. If the patterns of zero elements and/or patterns of non-zero elements do not satisfy a threshold similarity to the stored patterns of zero elements and/or patterns of non-zero elements, then the sparsity evaluator 216 determines that the weighting coefficient vector C is out-of-domain.

In other embodiments, the sparsity evaluator 216 compares the number of non-zero values of the weighting coefficient vector C (or the number of zero values of the weighting coefficient vector C) to the sparsity threshold. The sparsity threshold can be manually determined by an administrator or other user. In some embodiments, a low number of non-zero values represents a low number of templates of the dictionary being used to represent the dictionary reconstruction $$y_b'.$$

In other words, the in-domain information in the dictionary $D_b$ can be mapped to the output of the LLM block $y_b$, where the information in the dictionary (e.g., the templates) represents an overcomplete pool of in-domain information. Accordingly, if the sparsity evaluator 216 determines that the weighting coefficient vector C is sparse (e.g., the number of non-zero values of the weighting coefficient vector C satisfies the sparsity threshold), then the output of the LLM block $y_b$ is in-domain.

In contrast, a high number of non-zero values represents a large number of templates of the dictionary $D_b$ being used to represent the output of the LLM block $y_b$. A non-sparse weighting coefficient vector C can indicate an increased likelihood that the output of the LLM block is out-of-domain. A high number of non-zero values represents that the output of the LLM block $y_b$ could not be sparsely represented in the dictionary $D_b$ using a linear combination of the overcomplete pool of in-domain information. Accordingly, if the sparsity evaluator 216 determines that the weighting coefficient vector C is not-sparse (e.g., the number of non-zero values of the weighting coefficient vector C do not satisfy the sparsity threshold), then there is an increased likelihood that the output of the LLM block $y_b$ is out-of-domain.

In embodiments where there are multiple dictionaries for a single viven (e.g., $$D_b^k),$$

where for a block b there are k number of dictionaries, the sparsity evaluator 216 evaluates the weighting coefficient vector C used to determine the closest in-domain representation associated with each dictionary (e.g., $$y_1^{k'}).$$

Accordingly, for k numbers of dictionaries, there are k number of weighting coefficient vectors and corresponding sets of coefficients.

Example 200A illustrates the response manager 112 in monitoring mode. That is, the response manager 112 performs monitoring operations such as monitoring the sparsity determination determined by the sparsity evaluator 216. In some embodiments, the tracker 218 tracks a number of times the output of the LLM block is determined to be out-of-domain (based on the sparsity of the weighting coefficient vector C). For example, responsive to the sparsity evaluator 216 determining that the output of the LLM block is out-of-domain, the tracker 218 sets a flag. In some embodiments, during the monitoring mode, the operations of the LLM 110 can continue even if the output of the LLM block is determined to be out-of-domain. For example, even if it is determined that $y_1$ is likely out-of-domain, the output of the LLM block 1 (e.g., $y_1$ output from block 1 202) can be passed as an input $x_2$ to block 2 204. That is, $y_1=x_2$.

In some embodiments, the tracker 218 can track the number of set flags across multiple response managers 112 if there are multiple response managers 112. For example, if the tracker 218 of the response manager 112 associated with the jth block of the LLM 110 sets a flag indicating that the output of the jth LLM block is determined to be out-of-domain, the tracker 218 of the response manager 112 associated with the j+k (where k is a real value) block of the LLM 110 receives an indication of the flag set by the tracker 218 of the response manager 112 associated with the jth block of the LLM.

In some embodiments, if the number of set flags monitored (or otherwise stored) by the tracker 218 satisfies a flag threshold, the response manager 112 can trigger one or more predetermined responses. For example, instead of continuing the operations of the LLM 110 and passing the output of block 1 202 $y_1$ as an input $x_2$ to block 2 204, the LLM 110 ceases operations. In some embodiments, a predetermined response is set as response 114.

In some embodiments, the flag threshold can be one. That is, if the sparsity evaluator 216 determines that the output of the LLM block is out-of-domain, the tracker 218 sets a flag and the flag threshold is satisfied. Accordingly, the LLM 110 ceases operations and in some embodiments, the predetermined response is set as response 114. In other embodiments, the flag threshold can be set to a value greater than one and less than or equal to the N number of blocks of the LLM 110. In a non-limiting example, the predetermined LLM response is output if the output of three LLM blocks are out-of-domain, determined by the tracker 218 tracking the number of set flags associated with each out-of-domain output determined by a block of the LLM. In some embodiments, the number of set flags tracked (or otherwise monitored and stored) by the tracker 218 is provided to a user of a user system.

Example 200B illustrates the response manager 112 in substitution mode. That is, the response manager 112 performs substitution operations such as substituting an out-of-domain representation of the output of the LLM block (e.g., $y_b$) with a closest in-domain representation of the output of the LLM block (e.g., the dictionary reconstruction $$y_b'.$$

As shown in example 200B, the response manager 112 receives input $y_2$ from the output of block 2 204. The dictionary reconstruction manager 212 performs a dictionary reconstruction of the output of the LLM block (e.g., $y_2$) using the unique dictionary 220 and template predictor 226 associated with block 2 204. The dictionary reconstruction of the output of the LLM block (e.g., $y_2$) is determined to be $$y_2'.$$

To determine whether the output of the LLM block 2 204 is in-domain (e.g., whether $y_2$ of example 200B is in-domain), the sparsity evaluator 216 evaluates the sparsity of the weighting coefficient vector C used to determine the dictionary reconstruction, as described herein. If the sparsity evaluator 216 determines that the weighting coefficient vector C satisfies a sparsity pattern (e.g., the number of non-zero values of the weighting coefficient vector C satisfies the sparsity threshold), then the output of the LLM block $y_b$ is in-domain (e.g., $y_2$). If the sparsity evaluator 216 determines that the weighting coefficient vector C does not satisfy a sparsity pattern (e.g., the number of non-zero values of the weighting coefficient vector C does not satisfy the sparsity threshold), then the output of the LLM block $y_b$ is determined to be out-of-domain (e.g., $y_2$).

Responsive to determining that the output of the LLM block $y_b$ is out-of-domain, the response manager 112 substitutes the output of the LLM block with the dictionary reconstruction (e.g., the closest in-domain representation).

For example, the output of the LLM block $y_2$ is substituted with the dictionary reconstruction $$y_2'$$

such that the input to the next block of the LLM is the dictionary reconstruction $$y_2'.$$

In other words, the dictionary reconstruction $$y_2'$$

replaces the output of the LLM block $y_2$. Accordingly, $x_3$ is set to $$y_2'$$

and the operations of block 3 206 progress.

In some embodiments, even when the response manager 112 is performing substitution operations, the response manager 112 can perform monitoring operations. For example, the tracker 218 can set a flag indicating that the output of the LLM block (e.g., block 2 204) was out-of-domain.

Figure 3:
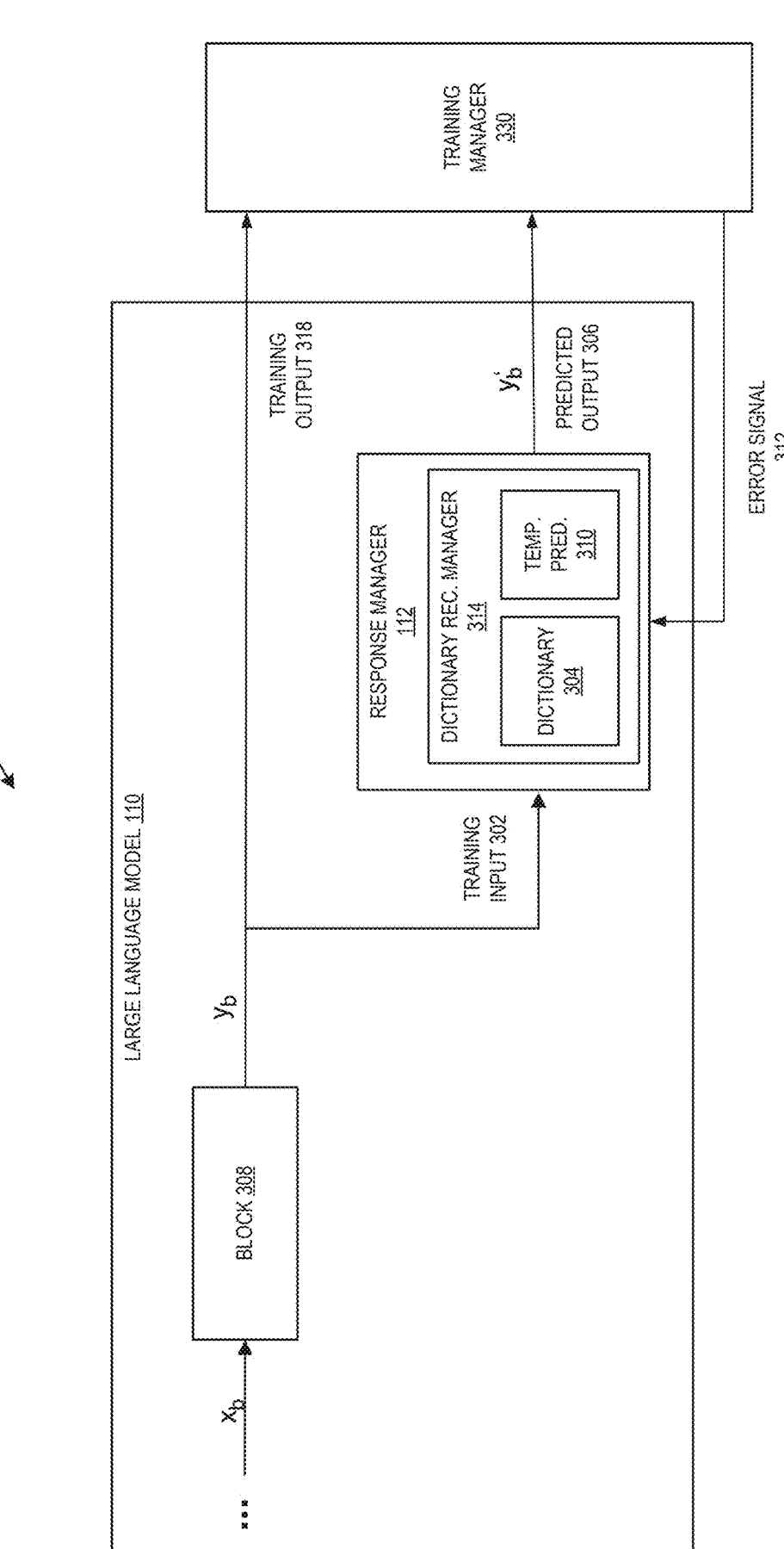
FIG. 3 is a flow diagram of an example method for training the response manager using self-supervised learning, in accordance with some embodiments of the present disclosure.

FIG. 3 is a flow diagram of an example method for training the response manager using self-supervised learning, in accordance with some embodiments of the present disclosure. As described herein, the response manager 112 supplements one or more blocks of the LLM 110. Each response manager 112 includes a dictionary reconstruction manager 314 which includes a dictionary 304 and a template predictor 310 that are each associated with a particular block of the LLM. As shown, dictionary 304 and template predictor 310 are associated with block 308. Given n blocks of the LLM 110 supplemented with a response manager 112, the training described in example 300 can be performed on each of the n dictionaries and corresponding n template predictors associated with each block of the LLM 110 supplemented with the response manager 112. As described herein, any one or more blocks of the LLM 110 can be supplemented with a response manager 112 and a trained dictionary 304 and trained template predictor 310.

In example 300, the input to block 308, $x_b$ can include a token representing domain-specific text (e.g., text 104 and/or log 108 described in FIG. 1) and/or an output determined by a previous block in the LLM 110. The output from the previous block of the LLM 110 is a vector of dimension d that represents an intermediate representation of domain-specific text and/or an intermediate representation of the predicted next token of response 114 described in FIG. 1.

The input $x_b$ corresponds to a set of training data used to train the dictionary 304 and the template predictor 310 described herein. In the case of multiple dictionaries for a single block (e.g., dictionary $$D_{B308}^1$$

associated with block 308 dictionary $$D^2_{B308}$$

associated will block 308), different sets of training data are used to train the dictionaries $$D^1_{B308} \text{ and } D^2_{B308}.$$

Similarly, multiple sets of training data are used to train the template predictors associated with the single block (e.g., a first template predictor associated with block 308 and a second template predictor associated with block 308). For example, a first set of training data including domain-specific training data (e.g., natural language questions and answers related to the specific domain, such as a stored conversation of a user speaking to a customer service agent in a hospitality domain) can be used to train the first dictionary associated with block 308 (e.g., $$D^1_{B308})$$

and the first template predictor associated with block 308 such that the response manager 112 outputs an in-domain representation of the domain-specific training data. A second set of training data including policy-specific training data (e.g., natural language sentences associated with a specific policy, such as safe for work sentences) can be used to train the second dictionary associated with block 308 (e.g., $$D^2_{B308})$$

and the second template predictor associated with block 308 such that the response manager 112 outputs an in-domain representation of the policy-specific training data.

The block 308 performs any one or more operations on the input $x_b$ to transform the input $x_b$ to output $y_b$. Operations performed by the block include projecting the input $x_b$ into a high dimensional representation, a low dimensional representation, encoding the input $x_b$, extracting features or properties associated with the input $x_b$, masking the input $x_b$, and/or some combination. As described herein, the block 308 can be an encoder block, a decoder block, a self-attention block, a cross-attention block, a feedforward block, etc. The output of the block 308 is output $y_b$ which is a vector of dimension d that represents an intermediate representation of domain-specific text and/or an intermediate representation of the predicted next token of response 114 described in FIG. 1.

As described herein, the response manager 112 decreases the likelihood that the predicted next token is out-of-domain by decreasing the likelihood that a representation determined by a block of the LLM is out-of-domain. The response manager 112 performs operations asynchronous to those of the operations performed by the LLM 110. Accordingly, the response manager can augment any LLM (e.g., pretrained LLM, fine-tuned LLM) configured to receive any input prompt (e.g., prompts generated using RAG, prompts generated using any prompt engineering techniques).

During training of the response manager 112, the operations of the LLM 110 (and specifically, the operations of each block of the LLM 110) are frozen. That is, the operations of the LLM 110 and each block of the LLM 110 are unchanged during training of the response manager 112. As a result, any domain-specific data input to the LLM 110 can be used to train the response manager 112.

The training manager 330 trains the response manager 112 to capture the subspace associated with the LLM block 308. In operation, the training manager 330 trains the dictionary 304 and the template predictor 310 of the response manager 112 that supplement block 308 of the LLM 110 using self-supervised learning. Self-supervised learning is a method of training a machine learning model where given data can be converted to input-output pairs. Mathematically, this is represented as the dictionary reconstruction being equal to the text representation, or $y_b = y_b'$. An input-output pair is an input with an associated known output. While self-supervised learning is described, other training methods, such as supervised learning, can be used to train the response manager 112.

A training input 302 of the input-output pair is the output of the LLM block 308. As shown in example 300, the output of the LLM block 308 (e.g., $y_b$) is passed as an input to the response manager 112. The training output 318 of the input-output pair is also the output of the LLM block 308 (e.g., $y_b$). As described herein, the dictionary reconstruction $y_b'$ determined by the response manager 112 is the closest in-domain representation of the output of the LLM block. Ideally, the closest in-domain representation of the output of the LLM block $$y_b'$$

(e.g., the dictionary reconstruction) matches the output of the LLM block (e.g., $y_b$). Accordingly, both the training input 302 of the input-output pair and the training output 318 of the input-output pair used to train the response manager 112 is the output of the LLM block 308 (e.g., $y_b$).

As described above, the dictionary reconstruction of the output of the LLM block is determined using a dictionary and a set of coefficients. Equation (1) is reproduced below.

$$y_b' = D_b C_b \qquad (1)$$

As described above, Equation (1) represents the dictionary reconstruction $y_b'$ as a linear combination of weighted templates in the dictionary $D_b$, where the weighted templates in the dictionary $D_b$ are determined using a set of coefficients of the weighting coefficient vector $C_b$. In other words, the templates of the dictionary $D_b$ are weighted according to the coefficients of the weighting vector $C_b$. Selecting the templates to be weighted by the weighting vector $C_b$ is represented mathematically according to Equations (1)-(2), which are reproduced below:

$$C_b = \sigma(U_b y_b) \qquad (2)$$

$$y_b' = D_b \sigma(U_b y_b) \qquad (3)$$

As described herein, $y$; represents the input to the response manager 112 (or the output of the block supplemented by the response manager such as block 308), and $\sigma$ is a non-linear activation function. Accordingly, the block-specific parameters to be trained by the training manager 330 include the dictionary $D_b$ and the template predictor $U_b$.

In some embodiments, both $U_b$ and $D_b$ are weight matrices of multilayer perceptrons (MLP) trained using the training manager 330. A MLP is a neural network with multiple layers, and each layer includes a number of nodes (e.g., neurons). The nodes perform a particular computation and are interconnected to nodes of adjacent layers using weights. Nodes in each of the layers sum up values from adjacent nodes and apply an activation function, allowing the layers to detect nonlinear patterns. The value of the weight interconnecting the nodes of adjacent layers adjusts the strength of the interconnected nodes in determining the output of the MLP and can be stored in a matrix such as $U_b$ and $D_b$.

The dimension of the dictionary $D_b$ is d×N and the dimension of the template predictor $U_b$ is N×d, where d represents the dimension of the representation based on the dimension of the output of any block of the LLM 110 since the output of any block of the LLM 110 has the dimension d×l, and N can be a hyperparameter determined during training that represents the number of templates in the dictionary $D_b$. As described herein, the dictionary $D_b$ should be an overcomplete dictionary such that there is a large number of templates in the dictionary D. In other words, the dictionary has more templates than the space of features to be represented by the templates. For ease of description, both template predictor $U_b$ and dictionary $D_b$ are described herein as weight matrices of MLP. In other embodiments, template predictor $U_b$ and dictionary $D_b$ are functions.

The templates corresponding to each row of dictionary Dy can be learned using the training manager 330 such that the dictionary $D_b$ represents the unique domain-specific or policy-aligned sub-space associated with a block of the LLM (e.g., block 308 of LLM 110). Further, the prediction of each template associated with an input signal such as $y_b$ can be learned using the training manager 330. That is, the template predictor $U_b$ can be trained to predict templates of dictionary $D_b$ given the characteristic that $$y_b'$$

is sparsely represented in dictionary $D_b$.

In operation, weights of the template predictor $U_b$ and dictionary $D_b$ are initialized and adjusted over the course of end-to-end training. Training both the template predictor $U_b$ and dictionary $D_b$ together can be described as training the response manager 112 using end-to-end training. Beneficially, training both the template predictor $U_b$ and dictionary $D_b$ together makes training the response manager 112 more scalable. For example, as a domain evolves, new vocabulary can be introduced. In some embodiments, the LLM 110 can be retrained or fine-tuned to encode the new vocabulary, thereby expanding the domain learned by the LLM 110. The training manager 330 can train both the template predictor $U_b$ and dictionary $D_b$ together to capture the updates to the domain sub-space, including the expanded vocabulary added to the domain. In some embodiments, domains can shrink, and the training manager 330 can train both the template predictor $U_b$ and dictionary $D_b$ to capture the reduced sub-space of the domain.

In operation, the response manager 112 receives the training input 302 and the template predictor $U_b$ and dictionary $D_b$ pair are used to determined predicted output 306, which is the dictionary reconstruction $$y_b'.$$

The training manager 330 compares the predicted output 306 determined by the response manager 112 and the training output 318 determined by the block 308 to determine an amount of error or difference between the predicted output 306 and the training output 318. The error is computed using a loss function. Non-limiting examples of loss functions may include the square error function, the room mean square error function, and/or the cross-entropy error function. Equation (3) below represents training the LLM using cross-entropy loss:

$$LLM(t_{T+1}, \hat{t}_{T+1} \mid t_{1:T}) = -\sum_{v=1}^{V} t_{T+1}^{(v)} \log\left(\hat{t}_{T+1}^{(v)}\left(y_{1:T}^{b}\right)\right) \tag{3}$$

In Equation (3) above, the loss between the ground truth next token distribution (e.g., training output 318) is compared to the predicted next token distribution (e.g., predicted output 306). V is the size of the LLM vocabulary and the predicted next token is represented as $$\hat{t}_{T+1}\left(y_{1:T}^{b}\right),$$

where $$y_{1:T}^{b}$$

is the represented obtained from the dictionary associated with the training input 302 at the particular block b.

In some embodiments, the loss function can be updated such that the dictionary representation $$y_{1:T}^{b}$$

is equivalent to that of the LLM generation obtained using the output of the block $y_b$, which is the input to the response manager 112 (e.g., training input 302), which can be represented as $$x_{1:T}^{b}.$$

Equation (4) below represents this mathematically:

$$LLM(t_{T+1}, \hat{t}_{T+1} \mid t_{1:T}) = -\sum_{v=1}^{V} t_{T+1}^{(v)}\left(x_{1:T}^{b}\right) \log\left(\hat{t}_{T+1}^{(v)}\left(y_{1:T}^{b}\right)\right) \tag{4}$$

The error, represented by error signal 312, is used to adjust both the template predictor $U_b$ and dictionary $D_b$. For example, the template predictor $U_b$ and dictionary $D_b$ can be updated using a backpropagation algorithm, for instance. The backpropagation algorithm operates by propagating the error signal 312 through each of the weights of the template predictor $U_b$ and dictionary $D_b$ such that the weights adapt based on the amount of error. Over a number of training iterations, the error of the error signal 312 decreases, representing a convergence of the predicted output 306 and the training output 318.

The error may be calculated at each iteration (e.g., each training input 302 and training output 318 pair), batch, and/or epoch (e.g., a number of training input 302 and training output 318 pairs included in a set of training data). The training manager 330 trains the response manager 112 over a number of epochs such that the overcomplete dictionary $D_b$ can sparsely represent the inputs to $D_b$. That is, the dictionary 304 should be dense enough to span the domain-specific or policy-aligned sub-space associated with block 308 of LLM 110. Templates that are repeatedly present in the training data are captured using the overcomplete dictionary. In other words, sparsity is a pattern that emerges from training the dictionary $D_b$ and template predictor $U_b$ over multiple epochs or repetitions of templates in the training. The overcomplete dictionary $D_b$ allows for the sparse dictionary reconstruction determined using the template predictor $U_b$. In some embodiments, the level of sparsity of the trained dictionary is an indicator of how adapted the dictionary is to a particular domain, where dictionaries that are more overcomplete than other dictionaries represent a more trained or adapted dictionary with respect to that domain. In some embodiments, each template of the dictionary corresponds to domain-specific vocabulary.

Figure 4:
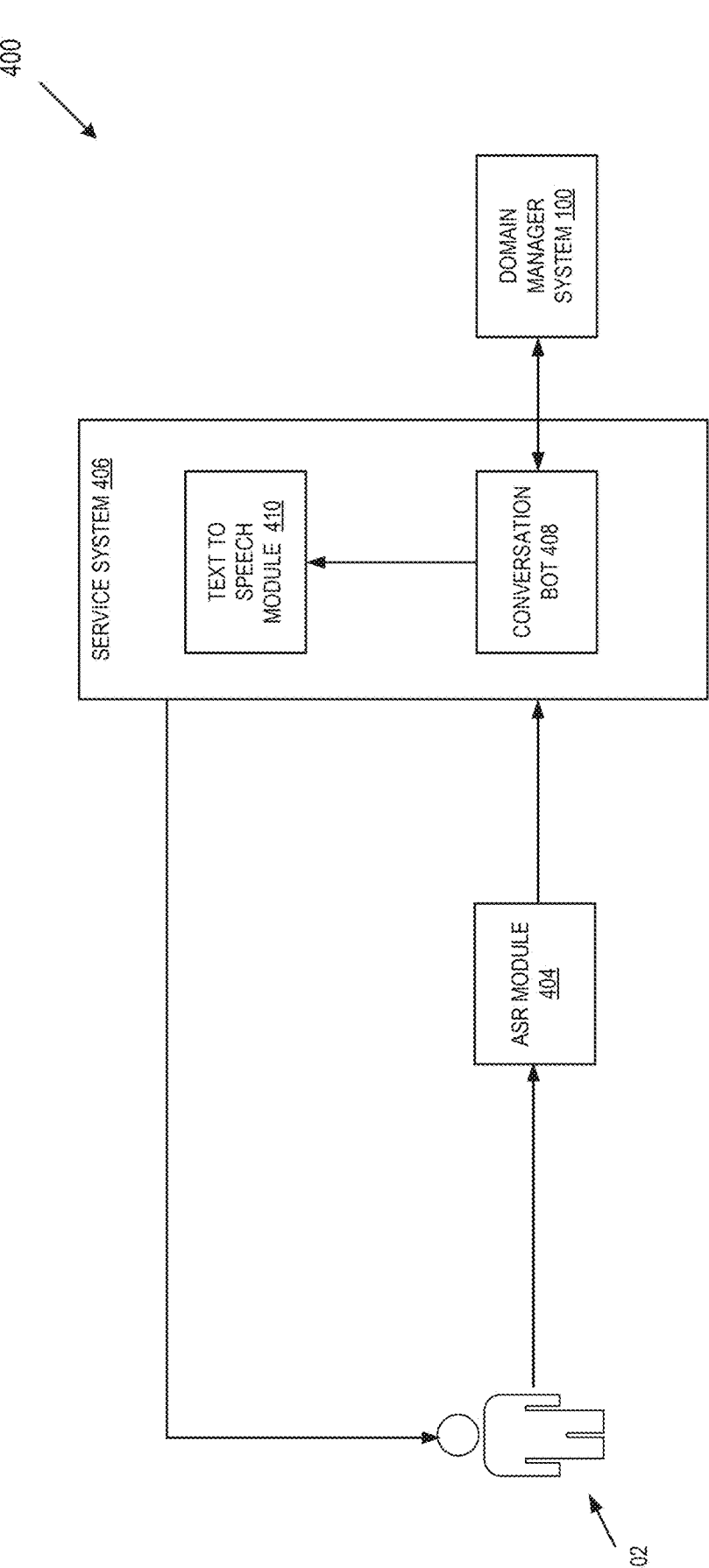
FIG. 4 illustrates an example deployment of the domain manager system, in accordance with one or more embodiments.

FIG. 4 illustrates an example deployment of the domain manager system, in accordance with one or more embodiments. The domain manager system 100 includes the components described above including a prompt manager (e.g., prompt manager 106 described in FIG. 1) and an LLM augmented with one or more response managers (e.g., LLM 110 with one or more response managers 112 described in FIG. 1).

Example 400 illustrates a user 402 communicating with service system 406. The service system 406 is any type of system that provides a service to the user 402 (e.g., doctor's office, technical support, hospitality, etc.). The communication can be an audio communication (e.g., a telephone call), a visual communication (e.g., a video call), a message communication (e.g., text messages), or other type of communication. For example, a user may open up a web browser and initiate a message with a conversation bot 408 of the service system 406. Example 400 describes an example embodiment in which the communication between the user 402 and the service system 406 is audio communication (e.g., a telephone call, a VoIP call, an intercom, etc.).

The audio communication between the user 402 and the service system 406 includes an audio signal. The information of the audio signal (e.g., words) are transformed into text using ASR module 404. In some embodiments, the service system 406 hosts the ASR module 404. The ASR module 404 may use any suitable method of text recognition such as any one or more natural language processing algorithms to convert the audio signal from the user 402 into text. In some embodiments, each word spoken by the user 402 is converted to text. In some embodiments, the ASR module 404 passes each of the words spoken by the user 402 to the service system 406 as natural language tokens. The text and/or tokens are passed to the conversation bot 408 for processing.

The conversation bot 408 can be an automated agent of the service system 406 (e.g., a chat bot such as a large language model). In some embodiments, the conversation bot 408 calls the domain manager system 100. For example, the conversation bot 408 uses an Application Programming Interface (API) to request the domain manager system 100 process the tokens obtained from the ASR module 404. An API refers to an interface or communication protocol in a predefined format between a client and a server, for instance. In response to receiving an API call, an action is initiated and generally a response is communicated. For example, responsive to receiving the API call, the domain manager system 100 can determine one or more predicted next tokens (e.g., a response) to the text determined by the ASR module 404. The conversation bot 408 can receive the one or more predicted next tokens (e.g., the response) and in some embodiments, perform subsequent processing.

In some embodiments, the conversation bot 408 is the LLM included in the domain manager system 100, where the LLM is augmented with one or more responses managers as described herein. In these embodiments, the domain manager system 100 can be hosted by the service system 406.

The domain manager system 100 receives a tokenized representation of a portion of the conversation (e.g., a log of the words spoken by the user 402). As described herein, the prompt manager of the domain manager system 100 can buffer or otherwise store the text received from the ASR module 404. By storing the text received from the ASR module 404, the prompt manager can maintain a log of the conversation between the user 402 and the service system 406.

The domain manager system 100 performs the methods and processes described herein to determine a predicted next token. For example, a response manager (e.g., response manager 112 described in FIG. 1) of the domain manager system 100 supplements one or more blocks of the LLM configured to predict the next token (e.g., the conversation bot 408).

The response manager determines a dictionary reconstruction of an intermediate step of LLM using a set of coefficients and an overcomplete dictionary. If the sparsity of the set of coefficients satisfies a sparsity pattern (e.g., the set of coefficients is sparse), then there is an increased likelihood that the representation associated with the intermediate step of the LLM is in-domain. If the sparsity of the set of coefficients does not satisfy a sparsity pattern (e.g., the set of coefficients is not sparse), then there is an increased likelihood that the representation associated with the intermediate step of the LLM is out-of-domain.

In some embodiments, the domain manager system 100 ceases the processes of the LLM and provides the user 402 a predetermined in-domain LLM response. In some embodiments, the domain manager system 100 substitutes an out-of-domain representation associated with the intermediate step of the LLM with a closest in-domain representation associated with the intermediate step of the LLM (e.g., the dictionary reconstruction).

Changing the LLM response, from a response with one or more predicted next tokens that are based on representations determined using intermediate steps of the LLM that have increased likelihoods of being out-of-domain, to a predetermined in-domain LLM response, decreases the likelihood of out-of-domain responses determined by the LLM augmented with the response manager of the domain manager system. Additionally or alternatively, substituting a representation with an increased likelihood of being out-of-domain, determined by an intermediate step of the LLM, with the closest in-domain representation, increases the likelihood that the predicted next token is in-domain. That is, instead of a representation with an increased likelihood of being out-of-domain being propagated through subsequent blocks of the LLM, an in-domain representation that is closest to the representation with the increased likelihood of being out-of-domain is propagated through the subsequent blocks of the LLM. Accordingly, the domain manager system 100 decreases the likelihood that the predicted next token (based on the representations of an input token propagated through the LLM) is out-of-domain.

In example 400, the response generated using the conversation bot 408 and/or domain manager system 100 is transformed into audio using the text to speech module 410. The text to speech module 410 can convert natural language text into an audio signal using any suitable method. For example, the text to speech module 410 generates a synthetic voice communicating the response generated using the domain manager system 100 to the user 402. The response is communicated to the user 402 using the audio determined via the text to speech module 410.

Figure 5:
FIG. 5 illustrates a flowchart of a series of acts in a method of decreasing the likelihood that the predicted next token determined by a machine learning model is out-of-domain, in accordance with one or more embodiments.
Figure 5:
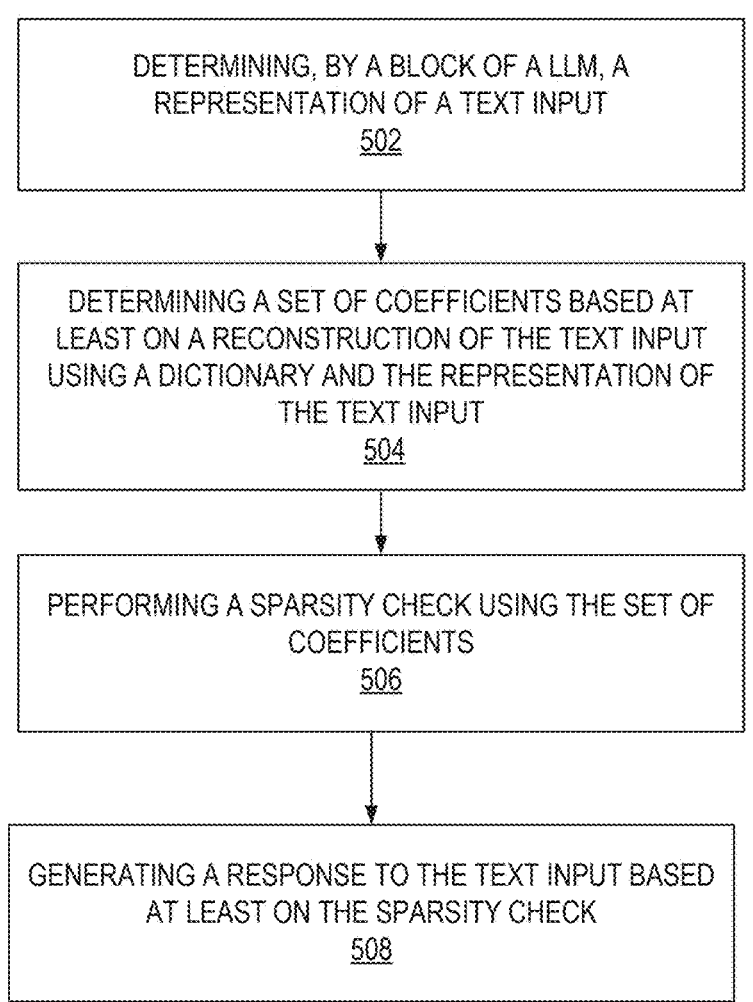

FIGS. 1-4 provide a number of embodiments and components configured to perform such embodiments that allow for decreasing the likelihood that the predicted next token (based on the representations of an input token propagated through a LLM) is out-of-domain. FIG. 5 illustrates a flowchart of an example method of decreasing the likelihood that the predicted next token determined by the machine learning model is out-of-domain, in accordance with one or more embodiments. It should be appreciated that FIG. 5 may be performed with additional or fewer steps than those indicated in FIG. 5. Moreover, the order of the steps indicated in FIG. 5 may be rearranged without changing the scope of FIG. 5.

FIG. 5 illustrates a flowchart 500 of a series of acts in a method of decreasing the likelihood that the predicted next token determined by a machine learning model is out-of-domain, in accordance with one or more embodiments. In one or more embodiments, the flowchart 500 is performed in a digital medium environment that includes domain manager system 100.

As illustrated in FIG. 5, the method 500 includes an act 502 of determining, by a block of the LLM, a representation of a text input. As described herein, a LLM can receive a text input. The text input can include any one or more words and/or characters associated with a user. In some embodiments, the text input can be a word-by-word stream of words transcribed in real time spoken by the user. For example, the text can be generated at a time when a user is actively engaged in a communication with the service provider. In some embodiments, the text input is a log. The log maintains a history of the conversation and/or a portion of the conversation. Portions of the conversation stored in log can include a number of past turns of the conversation, a number of the most recent text received (e.g., words, sentences, phrases, characters), a number of the most recent seconds of the conversation, a number of bytes of buffered text, and the like. A turn is an interaction of the conversation, such as block of speech (audio or text) communicated by one of the participants. For instance, one turn of the conversation can include a user speaking to an automated chat bot (e.g., an LLM). The log can be updated in real time as the communication between a user and a chat bot progresses. For example, each time the chat bot and/or user speak, the log is updated with a token corresponding to the spoken audio. In some embodiments, the log stores one or more tokenized representations of text. For example, one or more words, portions of words (e.g., characters), and/or one or more phrases of the conversation are stored as tokens in the log.

A block of the LLM represents a set of layers configured to perform a task of the LLM (e.g., an encoder block, a decoder block, a self-attention block, a cross-attention block, a feedforward block, etc.). Each sequential block of the LLM transforms the token into a representation (e.g., a high dimensional representation, a low dimensional representation, an encoded token, extracted features or properties associated with the token, a masked representation of the token, and/or some combination). The LLM can generate a predicted next token using the sequential processing of representations corresponding to the input token. Accordingly, each block performs one or more intermediate steps in determining the predicted next token in the response.

As illustrated in FIG. 5, the method 500 includes an act 504 of determining a set of coefficients based on a reconstruction of the text input using a dictionary and the representation of the text input. A dictionary captures the unique domain-specific or policy-aligned sub-space associated with a block of the LLM. The dictionary is a collection of in-domain templates (e.g., vectors, matrices, functions, etc.) that can be used to represent the output of the block (the representation of the text input). As described herein, the reconstruction of the text input is a linear combination of weighted templates in the dictionary and the dictionary, where the weighted templates in the dictionary are determined using the set of coefficients. Selecting the templates of the dictionary to be weighted by the set of coefficients is determined using the representation of the text input. For example, a machine learning model can receive the representation of the text input and predict templates of the dictionary associated with the representation of the text input.

As illustrated in FIG. 5, the method 500 includes an act 506 of performing a sparsity check using the set of coefficients. The set of weighting coefficients weighs each of the templates in the dictionary. Non-zero values of the elements of the weighting coefficient vector represent weights applied to the templates in the dictionary. Accordingly, fewer non-zero values of the set of coefficients represent a closer relationship of the text representation to the dictionary reconstruction. In contrast, larger numbers of non-zero values of the set of coefficients represent a more distant relationship of the text representation to the dictionary reconstruction, indicating a representation that is likely not constrained within the bounds of the dictionary.

In operation, the number of non-zero values of the set of coefficients can be compared to a sparsity pattern. If the number of non-zero values of the set of coefficients satisfies the sparsity pattern, then the set of coefficients and the representation is likely in-domain. If the number of non-zero values of the set of coefficients does not satisfy the sparsity pattern, then the set of coefficients and the representation is likely out-of-domain.

As illustrated in FIG. 5, the method 500 includes an act 508 of generating a response to the text input based at least on the sparsity check. For example, a closest in-domain representation of the representation determined by the block of the LLM can be substituted for an out-of-domain representation determined by the block of the LLM, based at least on the sparsity check. As described herein, one or more predicted next tokens of the text determined by the LLM become one or more tokens of the generated response.

Additionally or alternatively, a predetermined LLM response can be generated if the representation is determined to be out-of-domain, based at least on the sparsity check.

Figure 6:
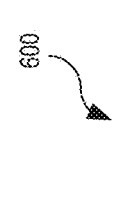
FIG. 6 illustrates a schematic diagram of an environment in which the domain manager system can operate in accordance with one or more embodiments.
Figure 6:
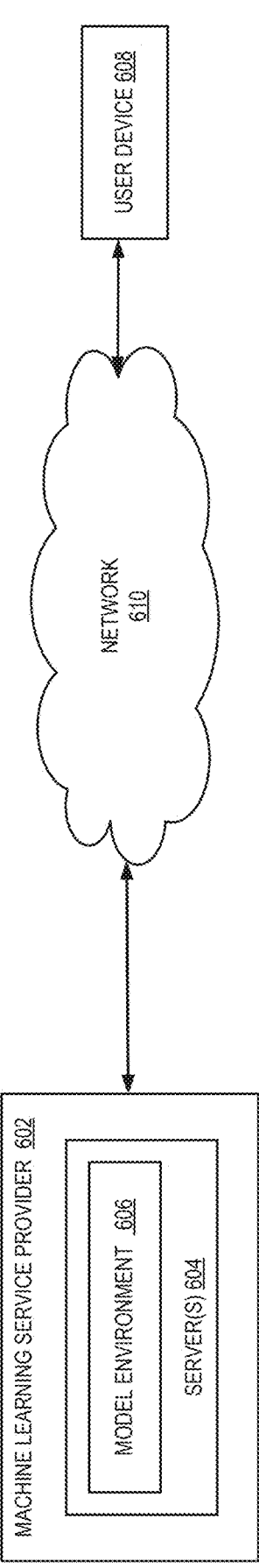

FIG. 6 illustrates a schematic diagram of an environment in which the domain manager system can operate in accordance with one or more embodiments. As shown, the environment 600 includes a machine learning service provider 602 communicating with a user device 608 via a network 610. It should be appreciated that while the user device 608 is shown communicating with the machine learning service provider 602 via network 610, the user device 608 may also communicate directly with the machine learning service provider 602. The communication between the user device 608 and the machine learning service provider 602 via network 610 may be any communication such as wireless communication and/or wired communication. In an example implementation, the machine learning service provider 602 may host the machine learning system on a server 604 using the model environment 606 and receive data from one or more user device(s) 608 via network 610.

The machine learning service provider 602 may be a service provider configured to perform one or more tasks. The machine learning service provider 602 includes one or more server(s) 604 each including a model environment 606. Each of the servers may be specialized to perform a given task of the machine learning service provider 602. Accordingly, each server 604 has a unique model environment 606 that facilitates the operation of the server. The model environment 606 may include any data necessary to perform the operations of the specific server 604 (e.g., trained machine learning models, training data, machine learning libraries, machine learning functions, etc.). In other configurations, a single server may be configured to perform multiple tasks of the machine learning service provider 602. That is, the server 604 may include multiple model environments 606.

The user device 608 may be any computing devices configured to communicate data to the machine learning service provider 602. In some implementations, the user device 608 may capture or otherwise collect such data (e.g., using a camera, a microphone, some combination, or other sensor).

To illustrate, data from one or more user device(s) 608 (e.g., an interaction with an application executing the domain manager system 100) may be fed to server 604 via network 610. Upon receiving the data, such as an initiation of a communication (e.g., a telephone call), the server 604 can execute the model environment 606 to execute the domain manager system 100. The domain manager system 100 performs the methods and processes described herein to decrease the likelihood that the predicted next token (based on the representations of an input token propagated through the LLM) is out-of-domain.

In some embodiments, the data obtained by the server 604 includes a transcript of the communication with the user device 608. In some embodiments, the functions of the machine learning service provider 602 may be implemented via a user device 608. Additionally or alternatively, the functions of the user device 608 may be implemented via the machine learning service provider 602. The functions of the user device 608 and/or machine learning service provider 602 may be implemented in hardware, software, or both. For example, the user device 608 and/or machine learning service provider 602 may include instructions stored on a computer-readable storage medium and executable by processors of the user device 608 and/or machine learning service provider 602. Computer executable instructions may include instructions that cause one or more processors to perform one or more functions. The computer executable instructions may be stored in any computer-readable media accessible by one or more processors of the machine learning service provider 602 and/or the user device 608. In some embodiments, one or more portions of functions of the user device 608 and/or machine learning service provider 602 may be implemented in hardware, software, or both.

While one user device 608 is shown, it should be appreciated that multiple user devices 608 may communicate with the machine learning service provider 602 via network 610. Additionally or alternatively, multiple user devices 608 may communicate with each other (e.g., without communicating with machine learning service provider 602). Moreover, while one machine learning service provider 602 is shown, it should be appreciated that multiple machine learning service providers 602 may communicate with one or more user devices 608. Similarly, multiple machine learning service providers 602 may communicate with each other (e.g., without communicating with the user device 608).

Figure 7:
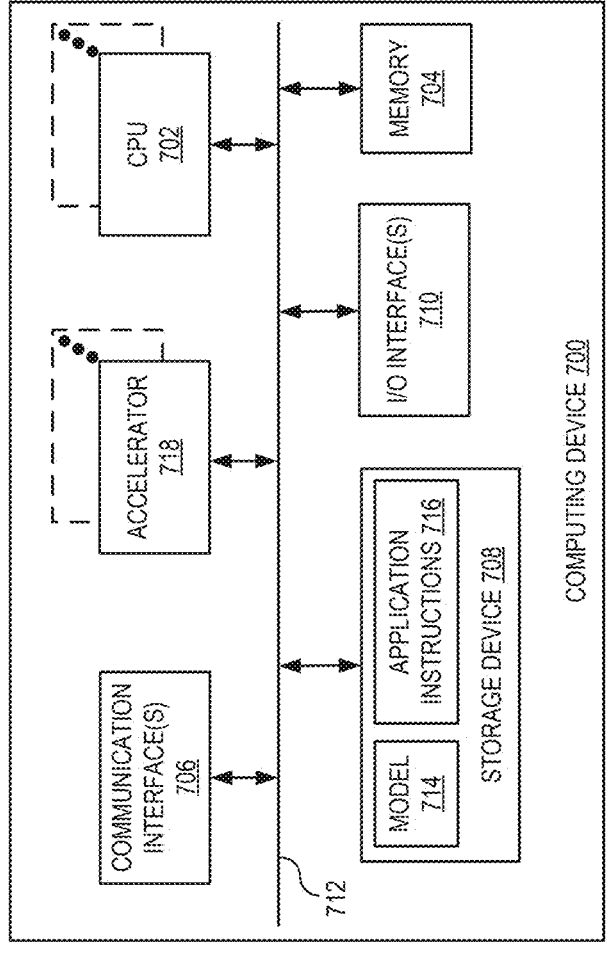
FIG. 7 illustrates a block diagram of an example computing device, in accordance with one or more embodiments.

FIG. 7 illustrates a block diagram of an example computing device, in accordance with one or more embodiments. One or more computing devices such as the computing device 700 may implement one or more portions of the domain manager system 100. As shown in FIG. 7, the computing device can comprise one or more central processing units (CPUs) 702, memory 704, one or more communication interfaces 706, a storage device 708, one or more I/O interfaces 710 and one or more accelerators 717. It should be appreciated that the computing device 700 can include different components than those shown in FIG. 7.

In particular embodiments, CPU(s) 702 include hardware and/or software for executing instructions. Similarly, accelerator(s) 717 include hardware and/or software for executing instructions. In some embodiments, accelerator(s) 717 include one or more graphics processing units (GPUs). In general, the accelerator(s) 717 and CPU(s) 702 fetch data from the storage device 708 and/or memory 704. For example, the accelerator(s) 717 and CPU(s) 702 may fetch instructions from the storage device 708 and/or memory 704 and execute one or more functions identified by the instructions. The CPU(s) 702 and/or accelerator(s) 717 execute the instructions to perform the one or more processes as described herein. For example, CPU 702 may receive instructions from memory 704 (e.g., a non-transitory computer readable medium) and execute those instructions, resulting in one or more processes described herein.

The storage device 708 and/or memory 704 may include non-transitory computer readable memory such as non-volatile and/or non-volatile memory (e.g., RAM, ROM, EEPROM, CD ROM, SSDs, flash memory). The storage device 708 and/or memory 704 may be configured to store different types of data fetched by the CPU 702 and/or accelerator 718. For example, the memory 704 may include instructions directed to the functional operation of the computing device 700. Moreover, the storage device 708 may include application instructions 716 and/or models 714 directed to the applicational use of the computing device 700. For example, the model 714 may include one or more components of the domain manager system 100 as described herein. The application instructions 716 may contain instructions necessary to perform the functions of one or more components of the domain manager system 100.

The computing device 700 can further include one or more communication interfaces 706. A communication interface 706 can include hardware, software, or both configured to facilitate external communication with one or more external computing devices. The external communication with one or more external computing devices may be wireless communication and/or wired communication. The communication interface 706 may be configured to facilitate such wired/wireless communication.

The bus 712 can facilitate internal communication of the computing device 700 and may comprise hardware, software, or both, coupling components of computing device 700 to each other.

The computing device 700 also includes one or more input or output ("I/O") interfaces 710. The I/O interface 710 is configured to receive inputs/outputs. In an example implementation, the I/O interface 710 may receive user inputs (e.g., audio data, text data, etc.). Additionally or alternatively, the I/O interface 710 may receive sensor inputs (e.g., camera images, video frames, etc.). The I/O interface 710 may be configured to output data (e.g., a response to a user input) to one or more other computing devices.

Various embodiments have been described and illustrated. The descriptions and illustrations herein are not to be construed as limiting. Alternate embodiments may exist without departing from the scope of the embodiments described and illustrated herein.

Disjunctive language such as "at least one of A, B, or C" is not intended to imply that a given embodiment requires at least one of A, at least one of B, or at least one or C. Instead, it is intended to be understood to mean either A, B, or C, or any combination thereof.

What is claimed is:

1. A method to constrain responses being generated by a large language model (LLM), the method comprising:

generating, by a prompt manager, an input for the LLM, wherein the input comprises a plurality of tokens;

generating, by the LLM being executed on a processing device, a response to the input, wherein the generating includes:

determining, by a block of the LLM, an output that includes a representation of at least one of the plurality of tokens;

determining a set of coefficients based at least on the output and a template predictor, wherein the template predictor was previously determined to predict templates in a dictionary responsive to outputs from the block, wherein the dictionary defines a previously detected sub-space representing outputs of the block that have a characteristic, wherein the characteristic represents one or more portions of a specific domain or alignment with a policy;

performing a sparsity check using the set of coefficients; and constraining the response being generated by the LLM when it is determined the response being generated is not within the previously detected subspace based at least in part on the sparsity check; and causing the response to be presented to a user as at least part of a subsequent turn in a conversation in which the user is actively engaged.

2. The method of claim 1, wherein the performing comprises:

comparing a number of non-zero elements in the set of coefficients to a sparsity pattern.

3. The method of claim 2, further comprising:

determining that the response being generated is within the previously detected subspace based on the number of non-zero elements in the set of coefficients satisfying the sparsity pattern.

4. The method of claim 2, further comprising:

determining that the response being generated is not within the previously detected subspace based on the number of non-zero elements in the set of coefficients not satisfying the sparsity pattern.

5. The method of claim 4, further comprising:

tracking a number of failed sparsity checks.

6. The method of claim 1, wherein the dictionary is a first dictionary, and the set of coefficients is a first set of coefficients, further comprising:

determining, by a second block of the LLM, a second output that includes a representation of at least one of the plurality of tokens;

determining a second set of coefficients based at least on the second output and a second dictionary; and performing a second sparsity check using the second set of coefficients, wherein the constraining is also based at least in part on the second sparsity check.

7. The method of claim 1, wherein the block of the LLM is at least one of an encoder, a decoder, a transformer, a feed-forward layer, a self-attention layer, or a cross-attention layer.

8. A non-transitory computer-readable storage medium storing executable instructions, which when executed by a processing device, cause the processing device to perform operations comprising:

generating, by a prompt manager, an input for a large language model (LLM), wherein the input comprises a plurality of tokens;

generating, by the LLM, a response to the input, wherein the generating includes:

determining, by a block of the LLM, an output that includes a representation of at least one of the plurality of tokens;

determining a set of coefficients based at least on the output and a template predictor, wherein the template predictor was previously determined to predict templates in a dictionary responsive to outputs from the block, wherein the dictionary defines a previously detected sub-space representing outputs of the block that have a characteristic, wherein the characteristic represents one or more portions of a specific domain or alignment with a policy;

performing a sparsity check using the set of coefficients; and constraining the response being generated by the LLM when it is determined the response being generated is not within the previously detected subspace based at least in part on the sparsity check; and causing the response to be presented to a user as at least part of a subsequent turn in a conversation in which the user is actively engaged.

9. The non-transitory computer-readable storage medium of claim 8, wherein the performing comprises:

comparing a number of non-zero elements in the set of coefficients to a sparsity pattern.

10. The non-transitory computer-readable storage medium of claim 9, wherein the operations further comprise:

determining that the response being generated is within the previously detected subspace based on the number of non-zero elements in the set of coefficients satisfying the sparsity pattern.

11. The non-transitory computer-readable storage medium of claim 9, wherein the operations further comprise:

determining that the response being generated is not within the previously detected subspace based on the number of non-zero elements in the set of coefficients not satisfying the sparsity pattern.

12. The non-transitory computer-readable storage medium of claim 11, wherein the operations further comprise:

tracking a number of failed sparsity checks.

13. The non-transitory computer-readable storage medium of claim 8, wherein the operations further comprise:

determining, by a second block of the LLM, a second output that includes a second representation of at least one of the plurality of tokens;

determining a second set of coefficients based at least on the second output and a second dictionary, wherein the second dictionary is different from the dictionary; and performing a second sparsity check using the second set of coefficients, wherein the constraining is also based at least in part on the second sparsity check.

14. The non-transitory computer-readable storage medium of claim 8, wherein the block of the LLM is at least one of an encoder, a decoder, a transformer, a feed-forward layer, a self-attention layer, or a cross-attention layer.

15. A system comprising:

a memory component; and a processing device coupled to the memory component, the processing device to perform operations comprising:

generating, by a prompt manager, and input for a large language model (LLM), wherein the input comprises a plurality of tokens;

generating, by the LLM, a response to the input, wherein the generating includes:

determining, by a block of the LLM, an output that includes a representation of at least one of the plurality of tokens;

determining a set of coefficients based at least on the output and a template predictor, wherein the template predictor was previously determined to predict templates in a dictionary responsive to outputs from the block, wherein the dictionary defines a previously detected sub-space representing outputs of the block that have a characteristic, wherein the characteristic represents one or more portions of a specific domain or alignment with a policy;

performing a sparsity check using the set of coefficients; and constraining the response being generated by the LLM when it is determined the response being generated is not within the previously detected subspace based at least in part on the sparsity check; and causing the response to be presented to a user as at least part of a subsequent turn in a conversation in which the user is actively engaged.

16. The system of claim 15, wherein the operations further comprise:

determining, by a second block of the LLM, a second output that includes a second representation of at least one of the plurality of tokens;

determining a second set of coefficients based at least on the second output and a second dictionary, wherein the second dictionary is different from the dictionary; and performing a second sparsity check using the second set of coefficients, wherein the constraining is also based at least in part on the second sparsity check.

17. The system of claim 15, wherein the performing comprises:

comparing a number of non-zero elements in the set of coefficients to a sparsity pattern.

18. The system of claim 17, wherein the operations further comprise:

determining that the response being generated is within the previously detected subspace based on the number of non-zero elements in the set of coefficients satisfying the sparsity pattern.

19. The system of claim 17, wherein the operations further comprise:

determining that the response being generated is not within the previously detected subspace based on the number of non-zero elements in the set of coefficients not satisfying the sparsity pattern.

20. The system of claim 15, wherein the operations further comprise:

tracking a number of failed sparsity checks.

21. The method of claim 1, wherein the constraining includes:

generating, based on the coefficients and the dictionary, a reconstruction representing an in-domain replacement for the output from the block; and replacing the output from the block with the reconstruction as the input to a device next block of the LLM.

22. The method of claim 1, wherein the constraining includes causing the response generated by the LLM to be a predetermined response rather than one generated using the blocks of the LLM.

23. The non-transitory computer-readable storage medium of claim 8, wherein the constraining includes:

generating, based on the coefficients and the dictionary, a reconstruction representing an in-domain replacement for the output from the block; and replacing the output from the block with the reconstruction as the input to a device next block of the LLM.

24. The non-transitory computer-readable storage medium of claim 8, wherein the constraining includes causing the response generated by the LLM to be a predetermined response rather than one generated using the blocks of the LLM.

25. The system of claim 15, wherein the constraining includes:

generating, based on the coefficients and the dictionary, a reconstruction representing an in-domain replacement for the output from the block; and replacing the output from the block with the reconstruction as the input to a device next block of the LLM.

26. The system of claim 15, wherein the constraining includes causing the response generated by the LLM to be a predetermined response rather than one generated using the blocks of the LLM.

* * * * *